June 23, 1964 H. LEAFQUIST ETAL 3,137,916
LATHE TURRET

Filed Aug. 8, 1962 2 Sheets-Sheet 1

INVENTORS
HERBERT LEAFQUIST
ELMER P. SJOSTROM
BY
*Ezekiel Wolf, Wolf & Greenfield*
ATTORNEYS INVENTORS
HERBERT LEAFQUIST
ELMER P. SJOSTROM
BY
Ezekiel Wolf, Wolf & Greenfield
ATTORNEYS

United States Patent Office 3,137,916
Patented June 23, 1964

3,137,916
LATHE TURRET
Herbert Leafquist and Elmer P. Sjostrom, Wakefield, Mass., assignors to Lawson Machine and Tool Co., Malden, Mass., a corporation of Delaware
Filed Aug. 8, 1962, Ser. No. 215,709
8 Claims. (Cl. 29—35.5)

This invention relates to lathe turrets and more particularly comprises a new and improved turret which has great reindexing accuracy.

The indexing accuracy of lathe turrets is ordinarily adversely affected by wear of the contacting parts and in the past indexing accuracy of a high order was only achieved with the most expensive lathe turrets whose costs were adversely affected by the wide use of bearings and other expedients to reduce wear. By minimizing the points of wear between the moving parts of lathe turrets increased accuracy is obtained.

One important object of this invention is to provide greater indexing and reindexing accuracy in relatively low cost lathe turrets.

A more specific object of this invention is to reduce the points of wear in the indexing assembly of lathe turrets so as to improve the reindexing accuracy of the device.

Still another important object of this invention is to provide an indexing assembly for lathe turrets, whose accuracy is not adversely affected by wear of the parts.

To accomplish these and other objects this invention includes among its important features and indexing assembly which includes an indexing plate and indexing pin retainer connected respectively to the turret base and body. The indexing plate includes several radially oriented seats defined by downwardly converging side walls which are adapted to support in line contact radially oriented pins in the retainer. The line contact between the pins and the seats minimizes the contacts between the parts, and these parts provide the sole support for the body of the turret, which in turn carries the various cutting tools. The pins are especially oriented with respect to the cutting tools so that when the pins are disposed in the seat a particular physical relationship exists between the position of the cutting tool and the lathe spindle which carries the work.

These and other objects and features of this invention along with its incident advantages will be better understood and appreciated from the following detailed description of one embodiment thereof, selected for purposes of illustration as shown in the accompanying drawing, in which.

Figure 1:
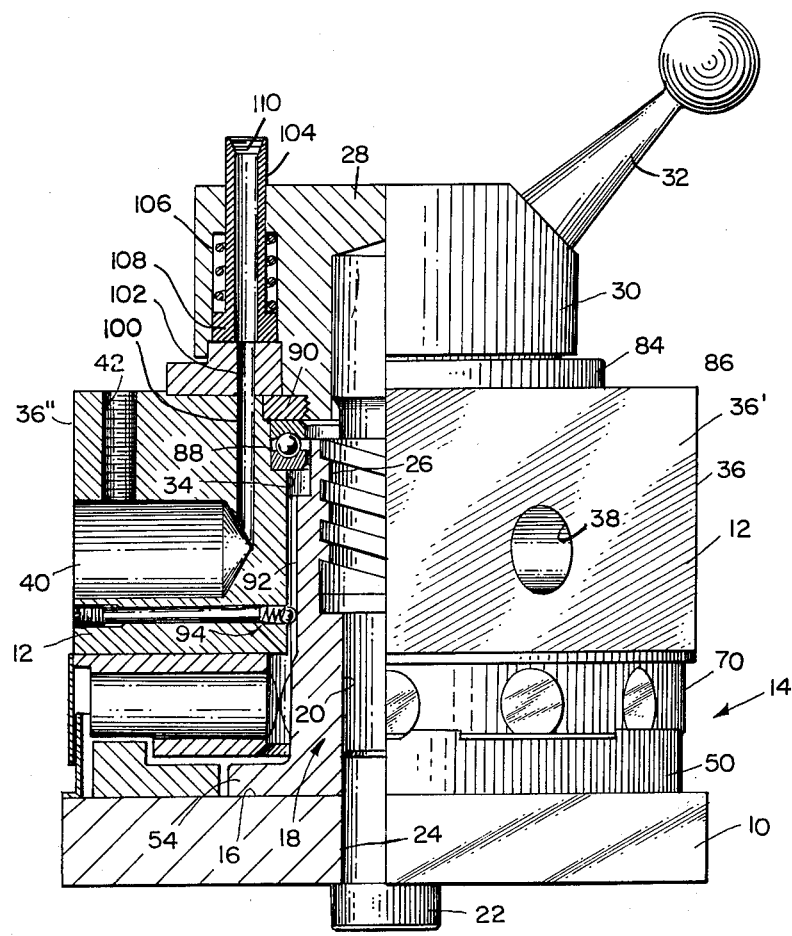
FIG. 1 is a side view, partly in section, of a lathe turret constructed in accordance with this invention.

The turret shown in the drawing includes a base 10 normally secured to the bed of the lathe on which the turret is to be used, a body 12 and an indexing assembly 14. The base 10 may be of virtually any shape and supports on its upper surface 16 a center post 18 having an internal bore 20. The center post 18 is oriented on the base 10 by a dowel plug 22 shown to extend upwardly in FIG. 1 through an opening 24 in the base and into the bore 20.

The center post 18 is internally threaded at its upper end as suggested at 26, and the threaded portion 26 receives a screw 28 attached to the head 30 of the turret. The head 30 in turn carries a handle 32 which then facilitates turning of the screw 28 in the threaded section 26 of the center post so as to raise and lower the head with respect to the base 10.

The body 12 is provided with a central bore 34 somewhat larger than the outer diameter of the center post 18 so that the body 12 may be slipped downwardly over the post when the parts are assembled. The body 12 may have one or more faces 36 which are provided with sockets or other expedients to enable the cutting tools to be mounted on them. In FIG. 1 one hole 38 is shown in face 36' of the body and a second hole 40 is shown on face 36", and each may either directly receive a cutting tool or an adapter which in turn carries the tool. A threaded opening 42 is shown vertically oriented in the head 12 in FIG. 1, and a screw may extend through the hole to secure the cutting tool in place. Obviously each such hole in each of the faces of the head will be provided with a similar fixture to enable a cutting tool to be secured in place.

The body 12 is capable of turning on the base 10 about the vertical axis of the center post so that each of the cutting tools carried on the body may be placed in an operative position with respect to the spindle (not shown) of the lathe. Preferably it is possible to orient each of the faces 36 of the body in two or more operative positions with respect to the spindle so that a wide variety of tools may be mounted on the fittings to in turn perform a wide variety of operations.

The indexing assembly 14 makes it possible for the turret to position the cutting tools accurately with respect to the spindle of the lathe and more particularly to reposition each of the cutting tools in the same position each time it is used to repeat its operation so that uniform parts may be made by the lathe. The assembly includes an indexing plate 50 having a central opening 52 formed therein which surrounds the large head 54 of the center post 18. The indexing plate 50 has a peripheral upwardly extending flange 56 provided with a number of holes 58 through which screws may extend to secure the plate 50 firmly to the base 10. Additional holes 59 extend through the plate 50 and may be employed to fasten the plate and base 10 to the bed of the lathe. Oriented 90° apart on the upper surface of the flange 56 are pin seats 60 each defined by a pair of blocks 62 having opposed and downwardly converging side walls 64 which terminate at the bottom wall 66 of the seat. The four seats 60 are substantially identical to one another; that is, their width, angle of convergence, and height are the same, being precisely machined into the flange 56 to achieve uniformity.

Figure 2:
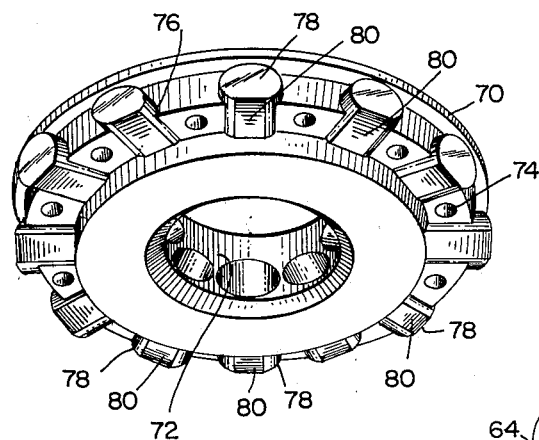
FIG. 2 is a perspective view, looking upwardly, of a portion of the indexing assembly forming part of the lathe turret shown in FIG. 1.
Figure 4:
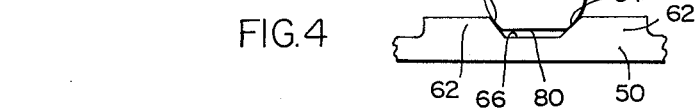
FIG. 4 is a fragmentary side view of the indexing assembly.

While the indexing plate is fixed to the base, an indexing pin retainer 70 shown in FIG. 2 is secured to the body 12 and rotates with the body above the center post 18. The retainer 70 is provided with a central bore 72 appreciably larger than the diameter of the center post and smaller openings 74 about its periphery through which machine screws may pass to anchor the retainer to the body. A plurality of radial bores 76 extend through the annular-shaped pin retainer, and each in turn carries in a press fit a pin 78 adapted to mate with each of the seats 60 formed in the flange 56 of the indexing plate 50. In FIG. 2 twelve such pins 78 are shown to be equidistantly spaced about the retainer 70. Initially the pins 78 when placed in the bores 76 are cylindrical but after being positioned in the bores to a selected depth the assembly shown in FIG. 2 is machined to provide flats 80 on the lower sides of the pins. The flats 80 are provided in the pins to prevent contact of the pins with the bottom walls 66 of the seats 60 when the pins are disposed in the seats. This is clearly shown in FIG. 4. In that figure it will be noted that the pin 78 makes only a line contact with each of the downwardly converging walls 64 of the blocks 62, and the flat portion 80 of the pin sits appreciably above the bottom wall 66 of the seat. The indexing accuracy achieved by this assembly will be fully recognized when the operation of the turret is described.

As there are twelve equally spaced pins 78 carried on the retainer 70 and there are four seats 60 in the plate 50, it is clear that the body 12 of the turret may assume any one of twelve positions with respect to the base 10 with the pins in the seats. It is also evident that at any one time when the retainer 70 and plate 50 are mated, four of the pins will be disposed in the seats, and by turning the retainer 30° four different pins may be aligned with the seats, and yet four different pins may be aligned with the seats when the retainer is turned an additional 30°.

The head 30 and screw 28 cooperate with the body 12 and center post 18 to retain the body in the selected index position with the pins firmly in the seats. The head 30 is turned by turning the handle 32, and as the head turns the screw 28 may be taken up in the threaded portion 26 of the center post to draw the head downwardly upon the body 12. A loading plate 84 which forms part of the head 30 bears directly upon the upper surface 86 of the body so that loading is achieved. Thrust bearings 88 cooperate through a ring 90 to prevent binding between the head 30, loading plate 84 and the body 12. The vertical thrust exerted by the bearings 88 reduces the force required on the handle 32 to loosen the screw 28 in the threaded portion 26 of the post to reposition the head 12.

Figure 3:
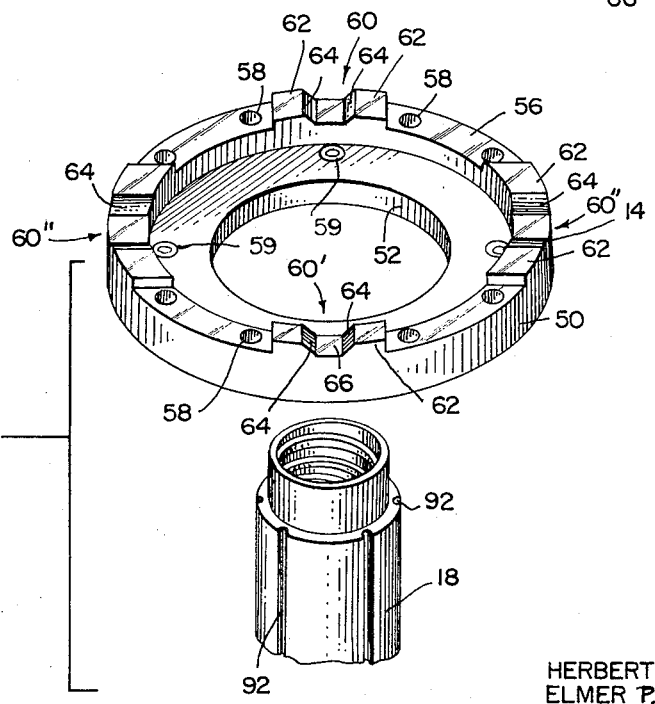
FIG. 3 is an exploded view of another part of the indexing assembly and support of the lathe turret shown in FIG. 1.

In FIGS. 1 and 3 it will be noted that the center post 18 is provided with a member of vertically extending recesses 92 in its outer surface which recesses are each adapted to receive the spring loaded ball detent 94 carried on the body. The recesses 92 are used for the approximate positioning of the head and enable an operator to detect when pins or the retainer are generally aligned with the seats of the indexing plate. The recesses 92 are preferably related to the pins carried by the retainer both in number and in angular orientation so that the operator may "feel" each of the twelve angular positions of the turret which are accurately achievable by the indexing assembly.

In FIG. 1 it will be noted that a passage 100 extends through the body 12 from its top surface 86 downwardly to the inner end of the tool fitting 40 in face 36". A similar passage is provided for each of the tool fittings in the head. Each of these passages is spaced the same radial distance from the axis of rotation of the body 12 so that each may in turn be aligned with the passage 102 in the loading plate 84 and the sleeve 104 mounted in the head 30. A spring 106 surrounds the sleeve 104 and bears against the enlarged end 108 of the sleeve to provide a seal between the sleeve and the loading plate. The upper threaded end 110 of the sleeve 104 is adapted to be connected to a coolant source, and thus the sleeve 104 and the passages 102 and 100 cooperate to define a path to direct a liquid coolant to the tools carried on the head. As the head 30 assumes the same angular position each time it is tightened on the body, each of the passages 100 in the body extending upwardly from the tool fittings will register with the passage 102 and sleeve 104 when each is placed in the operative position. Thus, when the tool fitting 38 is disposed in the position of fitting 40 in FIG. 1 its coolant passage (not shown) will be aligned with the other passages in the system so that the coolant may be directed to the tool carried in that fitting.

In operation the turret is mounted on the bed of a lathe and the several tools to be employed in the operation are fastened to the fittings on the faces of the body. After accurately setting each of the tools on the body with the corresponding pins disposed in the seats in the indexing assembly, the device is ready for use. When the body is in the position shown in FIG. 1 the tool mounted in fitting 40 is disposed in the operative position and is connected to the coolant supply. If the indexing plate 50 and retainer 70 shown respectively in FIGS. 3 and 2 are in the relative angular position of the corresponding parts shown in FIG. 1, then pins 78' shown in FIG. 2 are disposed in seats 60' shown in FIG. 3, and pins 78" are similarly disposed in seats 60". It should be appreciated that the angular position of the tool carried in the fitting 40 is controlled only by the engagement of the pins disposed in the four seats. After that tool has performed its operation on the work carried by the lathe spindle the operator loosens the head 30 by turning the handle 32 so that he may then turn the body 12 on the center post 18. Rotation of the head 30 elevates it by means of the engagement of the screw 28 in the threaded portion 26 of the center post, and when the head is raised the body 12 may be raised on the post to allow the pins in the seats to clear the side walls 64. The body thus may be turned so that any one of the other tools is disposed in its operative position and others of the pins 78 are disposed in the seats 60. When the desired set of pins is aligned with the seats which may be detected by the cooperation of the detent 94 and the vertically oriented recesses 92, the pins and seats are in line contact with one another and the head 30 may be retightened by turning the handle 32. When the head 30 is tightened so that the plate 84 exerts a holding pressure on the body 12, the cooling system is rendered operative for the tool disposed in the working position as its passage 100 is aligned with the passage 102 and the sleeve 104 of the head assembly.

From the foregoing description it will be appreciated that the relatively simple and inexpensive indexing assembly assures reindexing accuracy as there are no wearing parts which when worn affect the angular position of the pins 78 in the seats of the indexing plate. That is, any wear which does occur in the pins 78 or the walls 64 that define the seats will only affect the elevation of the body 12 on the base 10 and specifically will not affect the relative angular position of the body with respect to the base. And as the body is entirely supported on the base by the pins and seats, no other wear may occur which affects the indexing accuracy. Particularly, it should be noted that there is no radial contact between the center post 18 and the body which could wear and affect the indexing operation and all bearings have been eliminated between the body and the base and center post whose presence would increase the cost of the turret.

From the foregoing description those skilled in the art will appreciate that numerous modifications may be made of this invention without departing from its spirit. Therefore, it is not intended that the breadth of this invention be determined by the single embodiment illustrated and described. Rather, it is intended that the breadth of this invention be determined by the appended claims and their equivalents.

What is claimed is:

1. A lathe turret comprising
   a body having a plurality of seats to support cutting tools,
   an indexing pin retainer carried on the bottom of the body and having a plurality of radially oriented indexing pins secured thereto,
   a base carrying an indexing plate secured to its top and aligned with the pin retainer,
   said plate having a plurality of spaced pin seats disposed radially and each adapted to support a pin,
   said pin seats having downwardly converging side walls which make line contact with the sides of the pin seated between them,
   and means for elevating the body and turning it on its axis so that different pins may mate with the seats.

2. In a lathe turret,
   an axially movable body supported for rotation about its vertically oriented axis,
   an indexing plate disposed beneath the body and having an annular flange extending about an axis coincident with the axis of the body, a plurality of seats formed in the top of the flange and spaced about the flange, said seats each having radially extending side walls which converge in a downwardly direction, an indexing pin retainer secured to and movable with the body and having a central collar which fits within the flange of the indexing plate, and a plurality of radially oriented pins carried by the retainer and extending radially beyond the collar, said pins being spaced about the retainer and sized to fit between the converging walls of the seats and make line contact with the walls while being supported by the walls above the bottom of the seat, said pins thereby supporting the body on the seats.

3. A lathe turret comprising a base carrying a vertically oriented center post internally threaded at its upper end, a cutting tool carrying body rotatably supported about and free of contact with the center post and elevatable on the post, a plurality of vertically extending grooves formed in the outer surface of the post and a ball detent carried by the body and spring loaded into the grooves for approximately positioning the body in different angular positions on the post, an indexing plate seated on the base and surrounding the post and having an upstanding peripheral flange, four seats formed in the top of the flange displaced 90° apart on the flange, each of the seats having downwardly converging walls extending substantially radially on the flange thereby defining trough-like seats oriented radially on the flange, a plurality of radially oriented pins carried on the bottom of the body and each adapted to sit within the seats and make a line contact with the side walls and thereby support the body on the plate, and means cooperating with the internally threaded upper end of the center post for retaining the pins in the seats.

4. A lathe turret as described in claim 3 further characterized by said pins comprising at least one set of four pins disposed 90° apart.

5. A lathe turret comprising a body having a plurality of cutting tools carrying supports spaced about the body axis, an index pin retainer carried on the bottom of the body and carrying a plurality of horizontally disposed and radially extending pins in a number some multiple of the number of tool supports on the body, a base having pin seats formed therein adapted to receive the pins and orient the tool supports in preselected angular operative positions, means including a head and a screw carried above the base for loading the body with the pins in the seats, and passages formed in the body and the head and aligned with one another when the body is loaded on the seats for directing a coolant to the supports.

6. A lathe turret comprising a body member and a base member, means for rotating the body member with respect to the base member, a plurality of radially oriented seats formed on one of the members and a plurality of pins adapted to sit in the seats and carried by the other of said members, said pins and seats being in line contact with one another when the body is in an operative position on the base, and means for loading the members to retain the pins in the seats.

7. A lathe turret as defined in claim 6 further characterized by a cooling system operatively connected to the body member and adapted to supply coolant to the portion of the body member positioned to carry a cutting tool in an operative position.

8. A lathe turret as defined in claim 6 further characterized by said seats each being defined by a pair of converging side walls and said pins being flattened on the side facing the direction of convergence of the walls.

References Cited in the file of this patent

UNITED STATES PATENTS

| | | |
|---|---|---|
| 1,143,252 | Conradson | June 15, 1915 |
| 1,152,005 | Schellenbach | Aug. 31, 1915 |
| 2,202,117 | Muller | May 28, 1940 |